US008209839B1

(12) United States Patent
Brostmeyer et al.

(10) Patent No.: US 8,209,839 B1
(45) Date of Patent: Jul. 3, 2012

(54) PROCESS FOR RE-DESIGNING A DISTRESSED COMPONENT USED UNDER THERMAL AND STRUCTURAL LOADING

(75) Inventors: Joseph D Brostmeyer, Jupiter, FL (US); Andrew R Narcus, Loxahatchee, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 12/849,218

(22) Filed: Aug. 3, 2010

Related U.S. Application Data

(62) Division of application No. 11/605,858, filed on Nov. 28, 2006, now abandoned.

(51) Int. Cl.
*B23Q 17/00* (2006.01)

(52) U.S. Cl. ........... 29/407.05; 700/97; 700/98; 702/33; 702/35; 702/81; 702/183; 703/2; 703/6; 703/7; 703/9

(58) Field of Classification Search ............... 29/407.05; 700/97, 98; 702/33, 34, 35, 81, 82, 84, 183; 703/2, 6, 7, 9
See application file for complete search history.

(56) References Cited

U.S. PATENT DOCUMENTS 7,131,207 B2 * 11/2006 McFarland ...................... 33/503
7,177,030 B2 * 2/2007 Leizerson et al. ............ 356/504
7,239,398 B2 * 7/2007 De Groot et al. ............. 356/511
7,810,385 B1 * 10/2010 Narcus ........................ 73/112.01
7,905,031 B1 * 3/2011 Paulino ........................... 33/553
7,925,454 B1 * 4/2011 Narcus ............................ 702/34
2006/0288756 A1 * 12/2006 De Meurechy ................ 73/1.01
2008/0140359 A1 * 6/2008 Narramore et al. ............... 703/1
2009/0128557 A1 * 5/2009 Finlayson et al. ............ 345/420
2011/0153052 A1 * 6/2011 Pettibone et al. ............... 700/98

* cited by examiner

*Primary Examiner* — Derris Banks
*Assistant Examiner* — Azm Parvez
(74) *Attorney, Agent, or Firm* — John Ryznic

(57) ABSTRACT

A process for redesigning a distressed component, such as a turbine blade in a gas turbine engine, in which the distressed component is under thermal and structural loads, for improving the life of the component. The process includes obtaining the operating conditions of the machine in which the distressed component is used, finding the boundary conditions under which the distressed component operates, producing a 3-dimensional model of the distressed component with such detail that the distress levels are accurately represented on the model, subjecting the model to a series of technical analysis to predict a life for the component, reiterating the technical analysis until the levels of distress on the model accurately represent the distress that appears on the actual component, and then predicting a remaining life of the component based on the analysis, or redesigning the model and reanalyzing the model until a maximum life for the component has been found. When the maximum (or near maximum) life for a component has been found, the component is then manufactured with the new component having an increased life and possibly increased performance level.

5 Claims, 3 Drawing Sheets

PROCESS FOR RE-DESIGNING A DISTRESSED COMPONENT USED UNDER THERMAL AND STRUCTURAL LOADING

CROSS-REFERENCE TO RELATED APPLICATIONS

This application is a DIVISIONAL of U.S. patent application Ser. No. 11/605,858 filed on Nov. 28, 2006 and entitled PROCESS FOR REDESIGNING A DISTRESSED COMPONENT USED UNDER A THERMAL AND STRUCTURAL LOADING.

GOVERNMENT LICENSE RIGHTS

None.

BACKGROUND OF THE INVENTION

1. Field of the Invention

The present invention relates generally to the redesign of a distressed component that operates in a machine under thermal and structural loads, and more specifically to a process for re-designing a distressed component used in a gas turbine engine.

2. Description of the Related Art Including Information Disclosed Under 37 CFR 1.97 and 1.98

A gas turbine engine, such as an industrial gas turbine engine used to produce electric power, is a very complex piece of machinery. The design of components used in the engine, such as compressor blades, rotor blades, and stator vanes are not precisely designed at initiation into the engine. Because of the operating environment of the gas turbine engine, it is not common that a single part can have a perfect design in which the part will achieve or exceed its design life in the engine. Due to the fact that an industrial gas turbine engine must operate for very long time periods before a scheduled shutdown occurs (typical time period between scheduled shutdowns can be as high as 24,000 hours) all the components of the engine must be designed for a long life. If a component such as a rotor blade or compressor blade encounters premature failure, significant damage to the engine and its components can occur. The result is a distressed engine component with one or more worn or damaged portions. A distressed engine component is defined to be an engine component that has a design flaw that results in that component having a shortened life.

Since components in a gas turbine engine can be very expensive to replace, some engine operators have chosen to purchase replacement components from non-OEM suppliers (Original Equipment Manufacturers), because these components are typically less costly. However, a typical non-OEM component supplier will only copy the original component. If the original component (distressed component) has a design flaw (such as the component cracks prematurely) or is not as efficient as possible, then the replacement component will not perform any better than the original manufactured component. There is a need in the gas turbine engine field to be able to provide for a replacement component of an engine that will provide a longer life cycle in the engine and also improve the performance of the engine in order to reduce the life cycle cost of the engine.

BRIEF SUMMARY OF THE INVENTION

A process for re-designing a distressed component used in a gas turbine engine, in which the improved component has a longer useful life and improved performance. The process is directed to a component used in a gas turbine engine. However, this process can be used for any distressed component and not just for those used in a gas turbine engine. For example, a turbopump or a steam turbine both uses rotor blades that can be distressed from operation. Other components that are used with thermal and structural loads applied can produce levels of distress that shorten the component life, and would therefore benefit from the redesign process of the present invention for improving the component life or efficiency.

The process includes obtaining the engine operating conditions for a component thermal and structural evaluation and lifing, produce the boundary conditions that occur on the component during engine operation required for a technical analysis of the IGT component, metallurgical analysis and testing of component alloy and coatings are performed to verify operating conditions and perform life assessment, perform one or more of a CFD, structural, thermal, or vibration analysis of the competent in order to identify original design deficiencies or limiting areas, and predict the remaining useful thermal and structural life of the component from the thermal and structural analysis. The modeled distressed component is then compared to the actual distressed component to see if the modeling produces similar wear or damage that appears on the actual distressed component. If the modeled distressed component does not match the actual distressed component, then the boundary conditions or the model of the distressed component is changed and reanalyzed until the modeled distressed component has similar distress levels as the actual distressed component. From the identified design deficiencies, an improved design of the component is proposed and the new design is checked by further analysis. The multiple analyses are reiterated until a maximum remaining useful life for the component is found, and then the component is manufactured. The new manufactured component is then tested under aero and structural laboratory environment for further improvement in life. A new and improved design is then manufactured based on the laboratory testing. The result is a better gas turbine component with longer useful life and increased performance, resulting in reduced cost for operating the gas turbine engine. Although the present invention is described for designing a part used in an industrial gas turbine engine, the process could also be used for an aero engine or other turbo machines such as a turbopump and hypersonic engines.

One of the useful steps of the present invention is the use of a white light scanner to produce the 3D or solid model of the distressed component. For purposes of the present inventions, a 3D model is considered to be the same as a solid model. The white light scanner can reproduce the distress that appears on the actual component into the solid model with such precision that the model can be used to reproduce the wear or distress patterns for improving the component. Small cracks on the distressed component can be picked up by the white light scanner such that the solid model will reproduce the cracks.

DETAILED DESCRIPTION OF THE INVENTION

Figure 1:
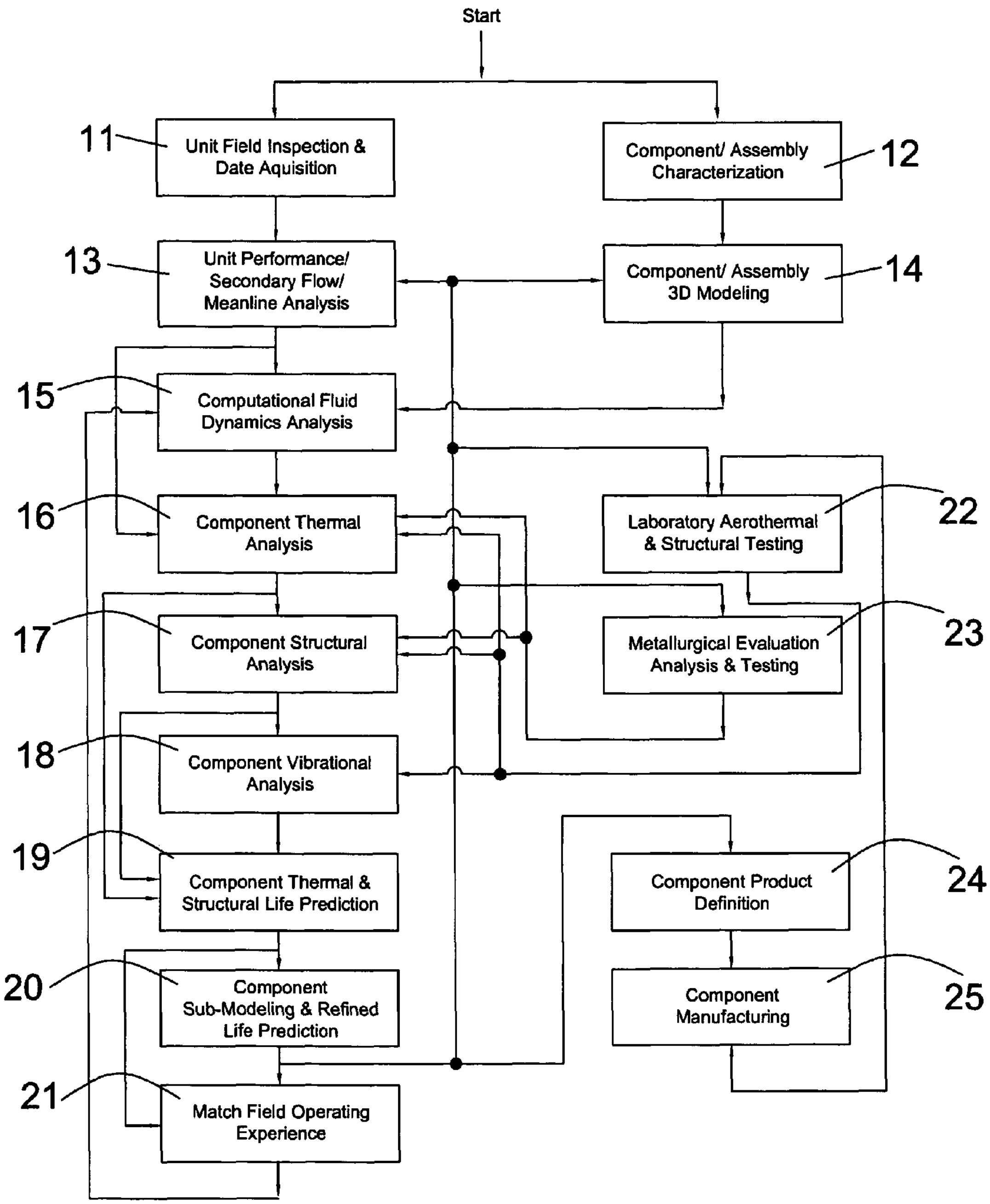
FIG. 1 shows the process for performing the distressed component re-design of the present invention.
Figure 2:
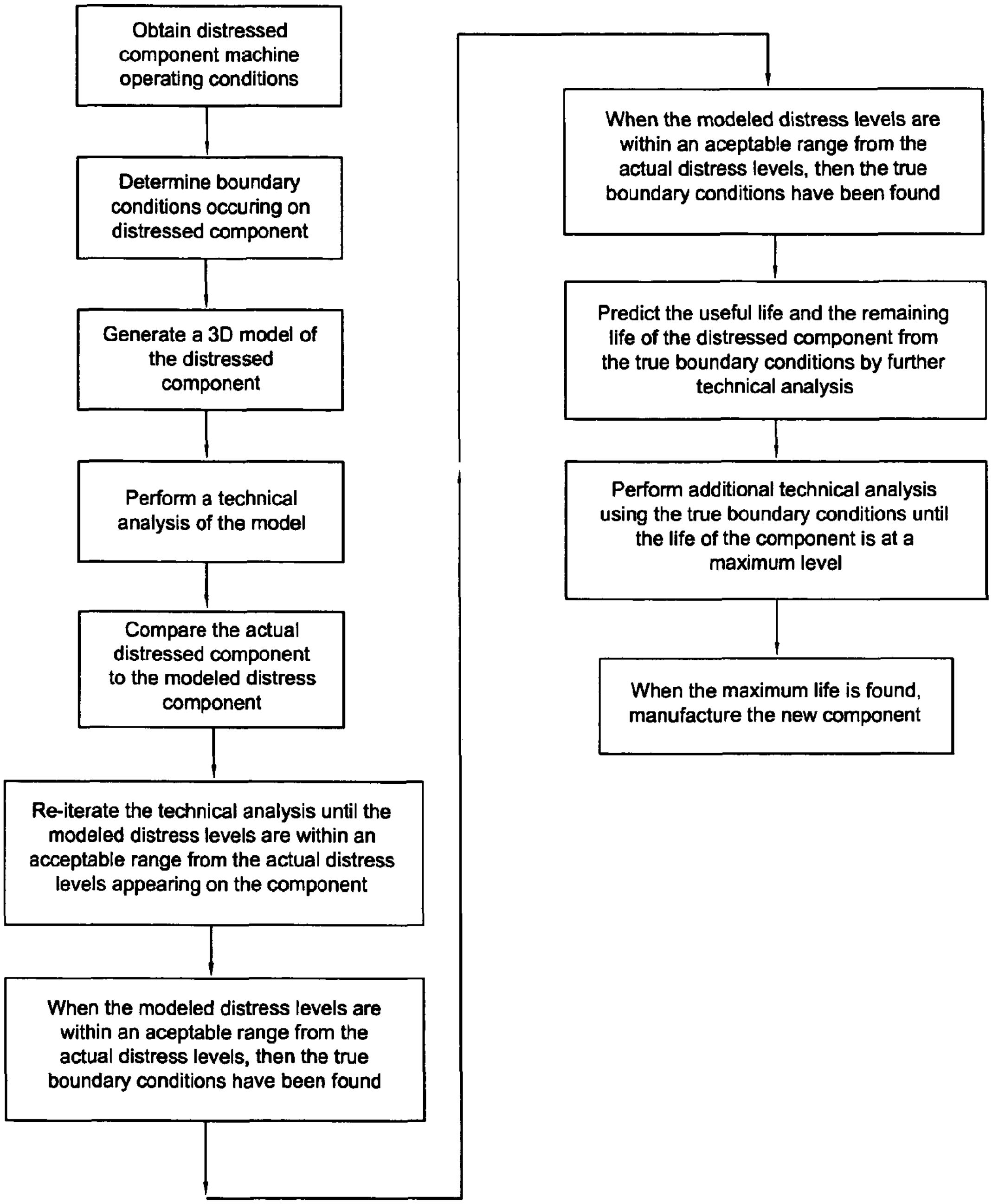
FIG. 2 shows a shortened version of the process for redesigning a distressed component.
Figure 3:
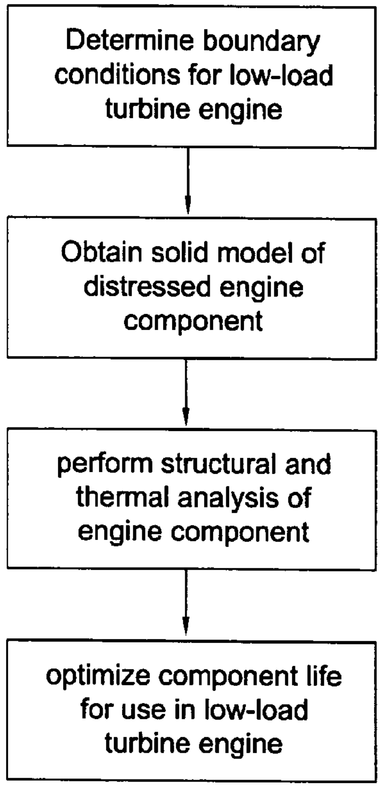
FIG. 3 shows an embodiment of the present invention in which a part is optimized for use in a low-load gas turbine engine.
Figure 4:
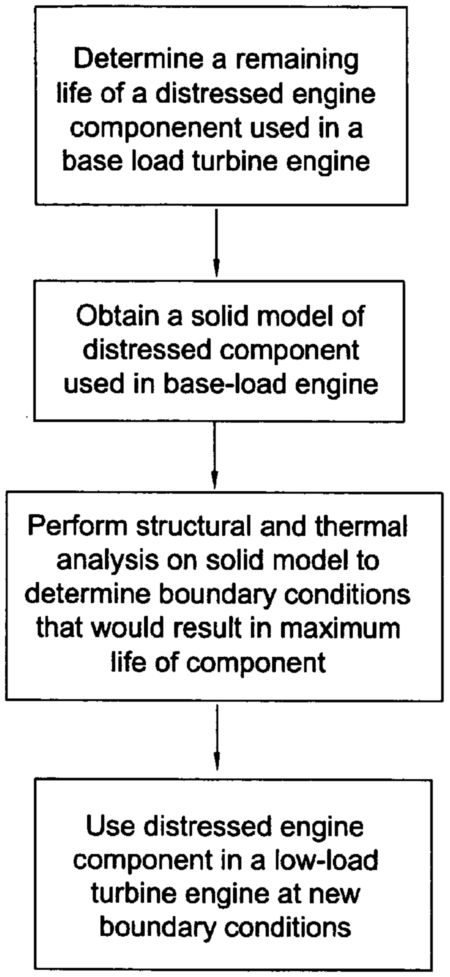
FIG. 4 shows an embodiment of the present invention in which a part is designed for use in a low-load engine but with new boundary conditions

The present invention is a process for re-designing a component used in a gas turbine engine such as a rotor blade or stationary vane used in the turbine or a compressor section of the engine. The process was developed for use with an industrial gas turbine engine because of the long operating period before shut-downs occur. However, the process can also be used for components used in an aero engine or other turbo machines such as a turbopump and hypersonic engines.

The first step in the process is the unit (gas turbine engine) field inspection and data acquisition (step 11), which is required for overall unit performance evaluation, mean-line analysis, and secondary flow modeling to create the operating conditions for component thermal and structural evaluation and lifeing. The acquisition of field unit data involves existing configuration component condition assessment; compressor, combustor, and turbine component core flow path geometry measurement; compressor and turbine component cold clearance measurements; detailed combustor and turbine component geometry measurements; identification and/or measurement of cooling and leakage air (secondary flow) passages throughout the entire unit; casing and rotor geometry measurements; acquisition of unit all operating conditions such as base load, part-power, off-design, and alternative fuels; acquisition of transient operating conditions and test data measurements; and acquisition of unit performance and/or commissioning test data. Thus, the unit field inspection and data acquisition is used for required input to performance/secondary flow/mean-line analysis for the unit.

Using the acquired field unit hardware and operational data, a performance/secondary flow/mean-line analysis are performed (step 13). This is an iterative process (performed multiple times) and includes the gas turbine modeling, turbine mean-line modeling and secondary flow modeling. The performance/secondary flow/mean-line analysis results are used to produce boundary conditions required for the technical analysis of the industrial gas turbine engine components. The gas turbine performance modeling step models the gas turbine side of the plant to identify the global operating performance of the unit (power, efficiency) as well as predict inlet, compressor, combustor, turbine, and exhaust operating parameters (pressure, temperature, flow rate). All compressor extraction flows and auxiliary flows are modeled. Inputs for the modeling include turbine mean-line model stage efficiency predictions, turbine mean-line model stage pressure ratios, turbine mean-line model diffuser loses, secondary flow model cooling and leakage flow rate prediction, and secondary flow model rotor pumping and windage predictions.

The turbine mean-line modeling models the turbine core gas path from combustor inlet to exhaust in order to predict stage to stage detailed operating parameters (pressure, temperature, flow rate, etc.), and produces accurate predictions of stage pressure and temperatures changes as well as stage efficiencies. Inputs include gas turbine performance model turbine inlet conditions and secondary flow model cooling and leakage flow prediction.

Secondary flow modeling models the cooling and leakage non-core gas path passages from compressor extraction to turbine component cooling and leakage discharge locations, and produces detailed prediction of the cooling and leakage flow rates and rotor operating pressures and temperatures. Inputs include turbine mean-line model stage pressures and gas turbine performance model compressor extraction conditions.

Next in the process (step 12) is the component/assembly characterization. Step 12 can begin when step 11 is started or anytime after. Characterization of a component/assembly involves hand measurements of component/assembly geometry, CMM/Faro-Arm measurements of component/assembly geometry used to provide precise geometry measurements of critical geometrical features, dimensional scanning of component/assembly geometry such as non-destructive "white" light surface digitizing technology to produce point-cloud of component features, CT scanning of component geometry such as non-destructive x-ray technology to produce point-cloud of component internal features, initial determination of component alloy/coating using hand-held material analyzer, mass/moment weight of components, airflow testing of component/assembly (test data used in technical analysis of component/assembly and product manufacturing airflow test specification), and vibration testing (impact/holography/SPATE/fatigue) of component/assembly (test data used in technical analysis of component/assembly and product manufacturing airflow test specification). Typical component scan quantities include 2 new/non-engine run, or 3 used/engine run components. The component/assembly characterization results are used to produce solid models/product definition of IGT components, to produce boundary conditions required for the technical analysis of IGT components, and to produce manufacturing test specifications. The white light scanning is performed using the ATOS (Advanced Topometric Sensor) from Capturesolid incorporated a company in Costa Mesa, Calif. The ATOS is a non-contact and material independent 3 dimensional digitization of an object or component accurate enough to measure the component distress (the component damage). Very precise measurements of the topography of a turbine component such as a turbine blade can be measured and produced on a 3-D or solid model. The measured detail of the distress on the component is of such detail that the cause of the distress can be discovered through the modeling and analysis process of this invention. An ATOS scan of a distressed component can be used to verify the results of a technical analysis for an engine component or determine the level of component life used or remaining. Determining the magnitude of component distress is critical to understanding how a component is reacting to the engine environment. Precisely measuring the component distress features is critical to determining the level of useful life consumed and the level of remaining life of the component. ATOS scanning of distress features such as alloy/coating thermal oxidation/erosion, alloy cracks, or alloy creep-affected component features provides a detailed and efficient measurement of the distress feature and overall component geometry that cannot be accurately or efficiently measured using other measurement techniques such as vernier caliper, pin gauge, CMM, and Faro-Arm measurements.

The generation of the component/assembly solid or solid model (step 14) from the characterization process involves a comparison of component dimensional scan data (the process used to identify nominal configuration and component tolerances), the generation of nominal component surface model, and the generation of solid model. The component/assembly solid modeling results are used to produce boundary conditions required for the technical analysis of IGT components and to provide geometry necessary for component/assembly product definition.

Component metallurgical evaluation and testing (step 23) is performed to identify the component material compositions such as alloys and coating, the quality of component material such as virgin and engine-run, the mechanical properties of component material (virgin and engine-run), and the degree of component distress such as crack features and alloy oxidation or erosion. The metallurgical valuation and testing results are utilized in the component analysis and life prediction of the IGT components.

One of the most critical steps of the IGT component redesign process is the identification of the component alloy and coating material properties. Typical alloys include poly-crystalline/equiax, directionally-solidified, and single crystal formulations. Typical coatings include MCrAlY, platinum aluminide, aluminide, APS TBC, and EBPVD (electron beam positive vapor deposition) TBC. A majority of material data is obtained from material/lifing databases. The material properties are utilized in component analysis and life prediction of IGT components.

The IGT components are subjected to laboratory aero-thermal and structural testing (step 22) in order to identify cooling system characteristics such as flow level, pressure loss, and feature losses; identify cooling system secondary flow characteristics to optimize cooling design; identify vibration characteristics such as natural frequency and mode vibration shapes; verify structural analysis stress patterns; and test for and verify component fatigue characteristics. The laboratory aero-thermal and structural testing includes air-flow testing, water-flow testing, transient heat transfer testing, vibration impact testing, holographic testing, fatigue testing, and SPATE (stress pattern analysis by thermal emissions) testing. The laboratory aero-thermal and structural testing results are utilized in component analysis and life prediction of IGT components.

Using the results of the Performance/Secondary Flow/Mean-line Analysis and component solid modeling, computational fluid dynamic analysis (CFD) of a component/assembly is performed in step 15 for the compressor components (steam-line/mean-line analysis for component aerodynamic loading and analysis), combustion system components (CFD analysis with reacting flow simulating combustion process to determine gas path boundary conditions), and turbine components (solid CFD analysis to determine loading, pressure boundary conditions, and gas path characteristics). The components/assembly solid CFD analysis results are used to produce gas path surface boundary conditions required for the technical analysis of IGT components.

Component thermal analysis is performed (step 16) to generate gas path and internal cooling flow boundary conditions, applied to solid analysis models. This includes externally/gas path boundary condition generation, internal/cooling system boundary condition generation, and secondary flow and end-wall boundary condition generation. Application of the generated thermal boundary conditions result in a complete solid thermal profile of the component. The component thermal analysis results are used for structural analysis and to produce component life predictions of IGT components.

Component structural analysis is performed (step 17) to identify the thermal and mechanical stress patterns that directly affect LCF (low cycle fatigue), creep, and crack growth life predictions. The component is analyzed to identify high temperature/stress locations for LCF lifing and to identify creep characteristics on a localized and section average basis to determine creep life.

A detailed component vibration analysis is performed (step 18) to identify the component natural frequencies, vibration mode characteristics, mode-driver operating margins, forced-response vibration characteristics, and component modal stress patterns and levels. Determination of steady and alternating stress levels are used to predict HCF (high cycle fatigue) life characteristics and assist with fracture mechanics predictions.

Using the results of the thermal and structural analysis phase of the re-design process from steps 16 and 17, the life of the component may be predicted (step 20). In order to predict the component life, accurate knowledge of the unit operating conditions over the goal life period must be known. For thermal life prediction, component life based on thermal prediction is limited by operating time (hours) in the unit, which is typically 24,000 hours, a typical refurbishment interval. Parameters that are controlled by thermal prediction include alloy and overlay/bond coating high temperature oxidation/erosion, alloy and coating low temperature corrosion, TBC aging/deterioration and sintering (surface temperature driven), and TBC spallation (interface temperature and strain driven). For structural life prediction, component life based on structural prediction is limited by operating time (hours) and cycles in the unit which is typically 48,000 to 72,000 factored hours and 900 to 2400 factored cycles. Parameters that are controlled by structural prediction include low cycle fatigue (LCF)/crack propagation, high cycle fatigue (HCF), thermal mechanical fatigue, and creep. Life prediction results must be compared/calibrated to component/assembly operating experience (step 21), with iterations performed until maximum component life has been found.

Upon completion of the component technical analysis work and generation of the component geometrical configuration, complete product definition of the component for manufacturing purposes can be performed (step 24). Product definition generally includes models and drawings to define casting, machined, coated, kit part, and assembly configurations. Product definition provides all of the information necessary for component manufacturing. During the product definition process, model accuracy and assembly checks are performed as a follow-up to original component modeling checks. The component is then manufactured (step 25), and the manufacture component is then tested in a laboratory environment (step 22) to identify cooling system characteristics such as flow level, pressure loss, a feature losses; identify cooling system secondary flow characteristics to optimize cooling design; identify vibration characteristics like natural frequencies and mode vibration shapes; verify structural analysis stress patterns; and test for and verify component fatigue characteristics. The laboratory aerothermal and structural testing results are utilized in the component analysis and life prediction of the component.

In summary, one of the most critical steps of the re-design process is to acquire unit operational data, component geometrical data, and assess component condition for the given operating conditions. Accurate knowledge of the unit operating conditions such as pressures, temperatures, flow rates, is accomplished through the performance/secondary flow/mean-line analysis and is required in order to generate boundary conditions for the analysis of the components. Detailed component characterization is imperative to identify component geometry, airflow characteristics, and vibration characteristics. Using geometrical characterization data, solid component models are generated for analysis and product definition purposes. Metallurgical analysis and testing of component alloy and coatings are required to verify operating conditions and perform life assessment. Accurate knowledge of component material properties for analysis and life prediction is critical to the re-design process. Laboratory aero-thermal and structural testing is important to understanding the component cooling system, vibration, modal stress pattern, and fatigue characteristics. 3D CFD analysis is performed to identify component operating environment for generation of boundary conditions for analysis. Detailed thermal, structural, and vibration analysis are required for accurate component life prediction. Precise product definition to identify casting, machining, coating, assembly, and kit part geometry is necessary for production manufacturing of the re-designed component having improved life and performance over the original component.

An example of the use of the inventive process with a turbine blade will be explained. An inspection of the gas turbine engine in which the part of interest (the turbine blade) is done to gather the operating conditions of the engine necessary to reproduce the engine conditions in the model. The engine performance/secondary flow, mean-line analysis is performed to produce the boundary conditions required for the technical analysis of the turbine blade. While this is done, the turbine blade is scanned using the white light scanning process to obtain a detailed geometry of the blade and therefore a very accurate solid model of the turbine blade. The blade material properties are identified, and any TBC material used also identified. With the boundary conditions known and the solid model developed, a computational fluid dynamics analysis and thermal analysis is performed on the turbine blade, and if required a structural analysis and a vibration analysis also performed. The analysis of the model is then compared to the actual turbine blade with the various distress patterns to compare the modeling to the actual conditions. If the modeling does not duplicate the conditions on the actual model, e.g. if a distress pattern on the actual turbine blade does not match the model results, then the boundary conditions and the solid model are updated. The analysis is then reiterated until the modeling is able to reproduce the distress levels observed on the actual turbine blade. Once the modeling is able to reproduce the distress that appears on the actual turbine blade, then it is assumed that the correct boundary conditions and model has been found. This is referred as base-lining the component.

With the correct boundary conditions and model found, the blade structure and/or the boundary conditions are then iterated and re-analyzed to determine the turbine blade life. This process is done several times until a maximum life time for the turbine blade is found under the changed boundary conditions and/or blade structure. With the maximum life time is found for the blade, the blade is manufactured and then tested under laboratory conditions for performance. If required, further design changes to the blade can be made in order to improve on the life time of the blade. Retesting and remanufacturing of the turbine blade is performed in order to find the optimized turbine blade design to provide the maximum life time under the identified boundary conditions. When the final blade design is identified and tested under required conditions, the turbine blade is manufactured for the last time and ready for use in the gas turbine engine.

As mentioned above, the ATOS (white light) scan of a distressed component can be used to verify the results of a technical analysis for an engine component or determine the level of component life used or remaining. When the actual distressed component is scanned, the details of the distress can be captured in the model. For example, if a turbine blade is burning because of a hot spot, a certain amount of blade material will be missing. The scan will accurately model the missing material. When the engineering analysis results in the proper boundary conditions being found that occur on the blade, and with the knowledge of the blade material, further engineering analysis can be used to reproduce the distress level on the model. As a result, the life of the component can be found that would lead to the observed distress level, and the remaining life of the component can be found. Also, the engineering analysis performed on a model can be verified by using the scanning process to accurately capture the details of the levels of distress occurring on the blade. The model goes through a series of engineering analysis until the proper boundary conditions are found. This is known when the analysis of the model will reproduce the distress pattern and level on the model as appears on the actual distressed blade. When the engineering analysis of the model can duplicate the distress that appears on the actual blade, then the engineering (technical) analysis can be considered verified.

Industrial gas turbine engines (IGT) are well known for their use in power production. There are several manufacturers of IGTs, and each is very different in operation and design. Also, each IGT can be operated differently. In an electrical power generating plant, several IGTs are used to drive generators and produce electrical power. In the local power service community, the electric load of the grid varies based upon electrical power demand. In the power plant, at least one IGT may be used as a base load (full power for 24,000 hours), while others are operated at peak loads or at part loads (low loads). A base load IGT will operate at 100% for the full run time of that engine, typically at 24,000 hours before off-loading the engine for inspection and service. In the base load operating condition, the engine heats up to the operating condition and the components remain exposed to this base-line operating condition for the full 24,000 hour period without varying much from that operating condition. If the electrical power demand for the service community exceeds the electrical production of the baseline IGT due to peak loads, then one or more peak load IGTs can be started up to supply the extra electrical power. In some situations, the peak load IGT may not even need to operate at 100%. In this case, the IGT will be operated at less than 100% because the electrical demand is less. Thus, in the peak load and part load or low load IGTs, the operating conditions are not at the design conditions for the engine at the 100% operating level. In the peak load and part load operating conditions, the operating conditions cycle between hot and cold, or from hot to warm in an engine that operates at baseline and then part load conditions. The cycling between operating conditions produces stresses on the components not seen in the base load operating conditions.

An industrial gas turbine engine is typically designed to operate at the most efficient operation to produce the most mechanical power (to drive the generator) while burning the least amount of fuel. As discussed above, one IGT may be used for base load while another of the same type would be used for part load. Thus, the two engines were designed to operate under the same conditions while one of them operates out of the design condition. This makes the interchanging of common parts less efficient than they could be. For example, one component of the IGT that was design to operate under 100% conditions in the engine could be used in another similar engine but under part load conditions. In the latter situation, the component could be considered to be over-designed. Re-using engine components can be very cost efficient since the components typical are very costly. In some situations, one component that will not last in an engine for the full 24,000 hours of baseline operation may be able to be used in a peak load or part load engine of similar type because the operating conditions are less than the base load conditions.

Also, a certain gas turbine engine operator may be using an engine at low power. An engine component that is designed to operate in an engine at base load conditions could be over-designed for use in the low power operating engine. For example, a base load designed component may require more cooling air flow or higher cooling air pressure than would be needed for operation in the low load engine condition. Use of this component in the low load engine would be less efficient than a newly designed component that would use less cooling air at a lower supply pressure. Thus, the redesign process of the present invention could also be used to redesign an engine component for use in a low load operation in order to optimize that component for a specific engine operating condition. A distressed engine component could be modeled according to the present invention and its remaining life determined. The component may not have enough remaining life for use in a base load engine, but may have enough remaining life for use in a peak load engine or even a low load engine. Using the process of the present invention, a distressed component could then be reused in another engine operating environment, saving the part from being destroyed while saving the cost of having to replace the component.

An example of the process for re-use of a distressed component will now be described. An engine is disassembled and a distressed turbine blade is found. The distressed turbine blade is analyzed according to the above described process for determining the blade remaining life under base load operating conditions. If the distressed blade cannot be used in a base load engine, then the remaining life for the blade is determined for a peak load engine, and then for a low load engine. The distressed blade is modeled to find what engine operating condition could be used in which the distressed blade would have the longest remaining useful life. The distressed turbine blade would then be used in an engine and that engine would be set to operate at the operation in which the distressed blade would have the longest remaining useful life.

In another process, an engine component with or without distress would be modeled under low load engine conditions to maximize the component useful life in the low load operating condition. For example, and engine may be operated under a low load condition and the blade would be re-designed in order to optimize the component for that specific operating condition. The blade would be re-designed such that it would require less cooling air flow and pressure for use in the low load engine such that the blade would have a long life in use in the engine with low load operation while also increasing the engine efficiency because of the lower cooling air flow and pressure required.

We claim the following:

1. A process for determining an amount of life consumed and remaining in a distressed component used in a machine under thermal and structural loading, the process comprising the steps of:

scanning the distressed component using a white light scanner to generate a computerized solid model of the distressed component with the distress features accurately reproduced in the solid model;

performing a technical analysis on the solid model using finite element analysis or computational fluid dynamics software;

changing the boundary conditions operating on the solid model in the finite element analysis or computational fluid dynamics software until the distress features of the actual distressed component are reproduced in the solid model; and, re-analyzing the solid model using the finite element analysis or computational fluid dynamics software with the proper boundary conditions to determine the amount of life consumed and the remaining life in the distressed component.

2. The process for determining an amount of life consumed and remaining in a distressed component of claim 1, and further comprising the step of:

the component distress features include at least one of alloy thermal oxidation or erosion, coating thermal oxidation or erosion, alloy cracks, and alloy creep-affected component features.

3. A process for verifying a distressed component technical analysis result of a distressed component used in a machine under thermal and structural loading, the process comprising the steps of:

scanning the distressed component using a white light scanner to generate a computerized solid model of the distressed component with the distress features accurately reproduced in the solid model;

performing a technical analysis on the solid model using finite element analysis or computational fluid dynamics software;

changing the boundary conditions operating on the solid model in the finite element analysis or computational fluid dynamics software until the distress features of the actual distressed component are reproduced in the solid model.

4. The process for verifying a distressed component technical analysis of claim 3, and further comprising the step of:

the step of performing a technical analysis on the solid model includes performing a thermal and a structural analysis.

5. The process for verifying a distressed component technical analysis of claim 3, and further comprising the step of:

the component distress features include at least one of alloy thermal oxidation or erosion, coating thermal oxidation or erosion, alloy cracks, and alloy creep-affected component features.

* * * * *